US006586101B2

(12) United States Patent
Chu

(10) Patent No.: US 6,586,101 B2
(45) Date of Patent: Jul. 1, 2003

(54) ANTI-REFLECTION COATING WITH TRANSPARENT SURFACE CONDUCTIVE LAYER

(75) Inventor: Jau-Jier Chu, Hsinchu (TW)

(73) Assignee: Applied Vacuum Coating Technologies Co., Ltd., Hsinchu (TW)

( * ) Notice: Subject to any disclaimer, the term of this patent is extended or adjusted under 35 U.S.C. 154(b) by 0 days.

(21) Appl. No.: 09/836,173

(22) Filed: Apr. 18, 2001

(65) Prior Publication Data
US 2002/0182393 A1 Dec. 5, 2002

(51) Int. Cl.[7] ............................................. B32B 15/00
(52) U.S. Cl. ..................... 428/432; 428/216; 428/336; 428/698; 428/701; 428/702; 359/586; 359/588
(58) Field of Search ................................ 428/216, 332, 428/336, 426, 432, 698, 704, 701, 702; 359/580, 581, 582, 585, 586, 587, 588, 589, 590, 591

(56) References Cited

U.S. PATENT DOCUMENTS

| 4,422,721 A | * | 12/1983 | Hahn et al. | ................. 359/585 |
| 4,921,760 A | | 5/1990 | Tani et al. | |
| 5,091,244 A | | 2/1992 | Biornard | |
| 5,105,310 A | | 4/1992 | Dickey | |
| 5,147,125 A | | 9/1992 | Austin | |
| 5,170,291 A | | 12/1992 | Szczyrbowski et al. | |
| 5,216,542 A | | 6/1993 | Szczyrbowski et al. | |
| 5,362,552 A | | 11/1994 | Austin | |
| 5,407,733 A | | 4/1995 | Bjornard et al. | |
| 5,541,770 A | | 7/1996 | Pellicori et al. | |
| 5,579,162 A | | 11/1996 | Bjornard et al. | |
| 5,728,456 A | | 3/1998 | Adair et al. | |
| 5,783,049 A | | 7/1998 | Bright et al. | |
| 5,952,084 A | * | 9/1999 | Anderson et al. | ........... 428/212 |
| 6,066,401 A | * | 5/2000 | Stilburn | ...................... 428/432 |

* cited by examiner

Primary Examiner—Deborah Jones
Assistant Examiner—Arden Sperty
(74) Attorney, Agent, or Firm—Rosenberg, Klein & Lee

(57) ABSTRACT

An anti-reflection coating layer system is composed of 4 oxide layers. The material of surface layer is a transparent conductive coating and has a high refractive index between 1.9 to 2.1. The materials used for the surface layer are a transparent conductive coating such as $SnO_2$, $ZnO_2$, $In_2O_3$, and ITO.

11 Claims, 2 Drawing Sheets

US 6,586,101 B2

ANTI-REFLECTION COATING WITH TRANSPARENT SURFACE CONDUCTIVE LAYER

FIELD OF THE INVENTION

The present invention is related to an optically effective layer system used for plastic and/or glass substrates, whereby the layer system has a high anti-reflection effect. More specifically the invention is related to a layer structure which contains a transparent conductive oxide as a surface layer and has a photopic reflectance below 0.5%.

BACKGROUND OF THE INVENTION

U.S. Pat. No. 4,921,760 discloses a multi-layer anti-reflection coating with excellent adhesion between a $CeO_2$ layer and a synthetic resin. The layer system includes $CeO_2$, $Al_2O_3$, $ZrO_2$, $SiO_2$, $TiO_2$ and $Ta_2O_5$. All of the thin films of the layer system a materials. There are 3 to 5 thin layers in the layer system. For a given example, the total thickness of the 5 layer structure is about 3580 Angstroms. The material of the surface layer of the layer system is $SiO_2$ which has a low-refractive index of about 1.46 at 550 nm.

U.S. Pat. No. 5,105,310 discloses a multi-layer anti-reflection coating designed for deposition in an in-line coating machine by reactive sputtering. The layer system includes $TiO_2$, $SiO_2$, ZnO, $ZrO_2$ and $Ta_2O_5$. All of the thin films of the layer system are oxide materials. There are 4 to 6 thin layers in the layer system. For a given example, the total thickness of the 6-layer structure is about 4700 Angstroms. The material of the surface layer of the layer system is $SiO_2$, which has a low-refractive index of about 1.46 at 550 nm.

U.S. Pat. Nos. 5,091,244 and 5,407,733 disclose a new type electric conductive light-attenuating anti-reflection coating. The major claim is an article comprising nitrides of certain transition metals to provide an electrically-conductive, light-attenuating, anti-reflection surfaces. The layer system includes TiN, NbN, $SnO_2$, $SiO_2$, $Al_2O_3$, and $Nb_2O_5$. The thin films of the layer system are nitride and oxide materials. There are 3 to 4 thin layers in the layer system. For a given example, the total thickness of the 4 layer structure is about 1610 Angstroms. The transmission of visible light of these two layer systems is below 50%. The material of the surface layer of the layer system is $SiO_2$ which has a low-refractive index of about 1.46 at 550 nm.

U.S. Pat. No. 5,147,125 discloses a multi-layer, anti-reflection coating using zinc oxide to provide UV rejection for wave-lengths shorter than 380 nm. The layer system includes $TiO_2$, $SiO_2$, ZnO, and $MgF_2$. All of the thin films of the layer system are oxides and a fluoride. There are 4 to 6 thin layers in the layer system. For a given example, the total thickness of the 5 layer structure is about 7350 Angstroms. The material of the surface layer of the layer system is $MgF_2$ which has a low-refractive index of about 1.38 at 550 nm.

U.S. Pat. No. 5,170,291 discloses a 4 layer system which is optically effective and has a high anti-reflective effect. The layers can be formed by either a pyrolytic method, a plasma-supported chemical vapor deposition method, a sputtering method or a chemical deposition method. The layer system includes $SiO_2$, $TiO_2$, $Al_2O_3$, ZnS, MgO and $Bi_2O_3$. For a given example, the total thickness of the 4 layer structure is about 2480 Angstroms. The material of the surface layer of the layer system is $SiO_2$ which has a low-refractive index of about 1.46 at 550 nm.

U.S. Pat. No. 5,216,542 discloses a 5 layer coating with a high anti-reflection effect. The process uses an adhesive layer of Ni, Cr or NiCr metal with a thickness of about 12 nm (nanometer). The other four layers are composed of $SnO_2$, $ZrO_2$, ZnO, $Ta_2O_5$, NiO, $CrO_2$, $TiO_2$, $Sb_2O_3$, $In_2O_3$, $Al_2O_3$, $SiO_2$, TiN and ZrN. For a given example, the total thickness of the 5 layer structure is about 2337 Angstroms. The transmission of visible light of this layer system is below 30%. The material of the surface layer of the layer system is $SiO_2$ which has a low-refractive index of about 1.46 at 550 nm.

U.S. Pat. No. 5,541,770 discloses a light attenuating anti-reflection coating including electrically conductive layers. This system is a four or five layer system. A light absorption high refractive index metal such as Cr, Mo and W was used as an optically effective thin film in the layer system. The other three or four layers are $TiO_2$, ITO, $Al_2O_3$, $SiO_2$ and TiN. The patent shows that the majority materials of the layer system are oxide and nitride, only one metal film was used as an optically effective thin film in the anti-reflection coating. For a given example, the total thickness of the 5 layer structure is about 1495 Angstroms. The transmission of visible light of this layer system is below 60%. The material of the surface layer of the layer system is $SiO_2$ which has a low-refractive index of about 1.46 at 550 nm.

U.S. Pat. No. 5,362,552 discloses a 6-layer anti-reflection coating that includes three layers of electrically conductive metal oxide. The layer system includes $SiO_2$, ITO, $Nb_2O_5$, and $Ta_2O_5$. Up to a total optical thickness of about one-wavelength of visible light of the electrically conductive metal oxide may be included in the coating. For one given example of a 6 layer structure, the materials and thickness of the major two layers within this 6 layer system are $SiO_2$, 854 Angstroms and ITO, 1975 Angstroms. The material of the surface layer of the layer system is $SiO_2$ which has a low-refractive index of about 1.46 at 550 nm.

U.S. Pat. No. 5,579,162 discloses a 4-layer anti-reflection coating for a temperature sensitive substrate such as plastic. One layer is a DC reactively sputtered metal oxide which may be deposited quickly and without imparting a large amount of heat to the substrate. The layer system includes $SnO_2$, $SiO_2$ and ITO. For one given example of the 4 layer structure, the materials and thickness of the majority two layers within this system are $SnO_2$, 763 Angstroms and $SiO_2$, 940 Angstroms. The material of the surface layer of the layer system is $SiO_2$ which has a low-refractive index of about 1.46 at 550 nm.

U.S. Pat. Nos. 5,728,456 and 5,783,049 disclose an improved way to deposit an anti-reflection coating on plastic film. The multi-layer thin films are coated by a roller coating with a sputtering process. The layer system includes ITO, $SiO_2$ and a thin lubricating over-layer which is a solvent-soluble fluoropolymer. For a given example, the total thickness of the 6 layer system is about 2630 Angstroms. The material of the surface layer of the layer system is $SiO_2$ which has a low-refractive index of about 1.46 at 550 nm.

The above description clearly shows that the material of the thin surface layer of the conventional optical layer system is $SiO_2$ or $MgF_2$, which have a low refractive index of 1.46 and 1.38 at 550 nm, respectively.

SUMMARY OF THE INVENTION

An object of the present invention is to provide an anti-reflection coating layer system composed of 4 oxide layers. The material of the surface layer is a transparent conductive coating and has a high refractive index between 1.9 to 2.1.

The process of manufacturing oxide thin films in volume production is high, reliable, and routinely used in industries such as semiconductor, disc head, LCD, CRT, architecture glass, touch sensor, screen filter and plastic web coating manufacturing for tens of years.

It is well known that the conventional layer structure for an anti-reflection optical coating has a surface layer of the optical coating that is a material of low refractive index such as $SiO_2$ with refractive index of 1.46 or $MgF_2$ with refractive index of 1.38. However, when the anti-reflection coating is applied in the display industry, for example, screen filters for computer monitors, or low reflection glass for flat CRTs, there are some bottlenecks in the process of high volume mass production. The basic reason is in the conventional optical layer structure, the conductive layer is buried by an insulating layer, for example $SiO_2$ or $MgF_2$.

In the general design rule of an anti-reflection coating, the first layer deposited on a substrate surface is a material with a high refractive index (namely H), and followed by a second layer which is a material of low refractive index (namely L). The basic design rule for the conventional anti-reflection coating has a layer structure such as HLHL or HL HL HL. In a simple case, if the material of H is ITO and the material of L is $SiO_2$, the 4 layer structure is Glass/ITO/$SiO_2$/ITO/$SiO_2$. Because ITO is a transparent conductive material, the multi-layer coating of this layer structure has electrical conductivity below 1000Ω square, and can be used as EMI shielding and/or for static electric discharge when the conductive coating layer is bonded to ground. However, the surface material of the conventional layer structure is $SiO_2$ and the typical thickness of the $SiO_2$ layer is about 1000Å. The material characteristic of $SiO_2$ is high density, with a property of being chemically inert, and is a very good electric insulator. In the application of the conventional anti-reflection coating in the display industry, it is difficult to make an electrical contact with the buried ITO layer which is isolated by an outermost $SiO_2$ layer. For a typical grounding process to make a metal contact with the ITO layer, an ultra-sonic welding procedure is needed to break through the insulating layer ($SiO_2$) and to make sure that a good contact of tin solder is made with the buried ITO conductive layer. This process is a bottleneck to the application of anti-reflection coatings in high volume.

On the other hand, the ultra-sonic welding process will produce small and bright contamination from tin spots, because of the presence of liquid tin, and the explosive ultra-sonic energy. This process also produces non-consistent contact resistance for each bus bar line, because the ultrasonic-welding process cannot guarantee to break through the insulating coating evenly, at the same depth, to get a uniform contact resistance with ITO layer.

The drawbacks mentioned above will reduce the yield of the manufacturing process for the application of a conventional anti-reflection coating. Therefore, it is quite important to have an anti-reflection coating by using ITO conductive film as a surface layer material. However, it is unusual in the design principle of an optical layer structure. As mentioned above, the conventional design principle for a 4 layer anti-reflection coating is HLHL. However, the layer structure described herein is HHLH, which is quite different from the conventional design of an anti-reflection coating. The present invention provides an anti-reflection layer system composed of 4 layers of oxide materials and the material of the surface layer has a high-refractive index between 1.9 to 2.1. The materials of surface layer are a transparent conductive coating such as $SnO_2$, $ZnO_2$, $In_2O_3$ and ITO.

Because the surface layer has a good electrical conductive property, the layer system reduces much of the work of grounding and also increases the total yield in volume production. The present invention provides a surface conductive layer structure of an anti-reflection coating, which can be applied not only in the display industry, but also in the touch sensor industry for glass and plastic substrates.

There are four layers, namely, the first, second, third and fourth layers in consecutive numerical order beginning with the layer furthest from the substrate for the present invention of an anti-reflection coating. Each layer is described in terms of physical thickness or optical thickness. The optical thickness is a mathematical product of a layer's thickness and its refractive index. It is described as a fraction of a selected wavelength. In the present invention the selected wavelength is about 520 nm.

The first or the surface layer is a transparent conductive oxide material. The oxide layer, preferably ITO, substantially slightly absorbs visible light, has a refractive index between 1.9 to 2.1 at a wavelength of about 520 nanometers (nm), and a physical thickness between 10 nm to 40 nm at selected wavelength. In other embodiments, the first layer may include such oxide materials other than ITO as: $SnO_2$, ZnO, $In_2O_3$, a combination of $SnO_2$ and F, a combination of $SnO_2$ and Sb, a combination of ZnO and Al, a combination of $In_2O_3$ and ZnO, a combination of $SnO_2$ and ZnO, and a combination of $In_2O_3$ and MgO.

The second layer is an oxide materal. The oxide layer, preferably $SiO_2$, is substantially non-absorptive for visible light, has a refractive index between 1.45 to 1.50, at a wavelength of about 520 nm and a physical thickness between 30 to 60 nm at the selected wavelength. In other embodiments, the second layer may include such other oxide material as $SiAlO_2$.

The third layer is an oxide materal. The oxide layer, preferably a Niobium oxide, generally denoted herein NbO, is substantially non-absorptive for visible light; has a refractive index between 2.1 to 2.3 at a wavelength of about 520 nanometers (nm) and a physical thickness between 30 nm to 80 nm at the selected wavelength. In other embodiments, the third layer may include such other materials as ITO, $Ta_2O_5$, a Titanium Oxide, and mixture of these oxides.

The fourth or the innermost layer is an oxide material. The oxide layer, preferably a Niobium-Silicon oxide, generally denoted herein NbSiO, is substantially non-absorptive for visible light, has a refractive index between 1.9 and 2.1 at a wavelength of about 520 nm and a physical thickness between 40 to 80 nm at the selected wavelength. In other embodiments, the fourth layer may include such oxide materials as a Tantalum-Silicon oxide, a Titanium-Silicon oxide, an Indium-Silicon oxide, a Tin-Silicon oxide, and mixture of these oxides.

In the preferred embodiment, the 4 layers coating includes a first layer of ITO having a thickness about 15 nm, a second layer of $SiO_2$ having a thickness about 58 nm, a third layer of NbO having a thickness about 45 nm, and a fourth layer of NbSiO having a thickness about 67 nm.

The stated objects are achieved by the present invention, a conductive front surface with a resistance between $10^2 \Omega$/square~$10^3 \Omega$/square can be obtained from the ITO coating, and a smooth wide band reflection spectrum can be obtained on the glass or plastic substrate in the visible range from 400 nm to 700 nm. It is easily demonstrated that the process is simple, reliable, easy to control and economical. It has become possible in this way to produce an anti-reflection coating with a good surface conductivity. Of particular advantage, an in-line sputtering system can be used to deposit the layer system of the present invention for low cost and high volume manufacturing.

On the other hand, the layer system of this invention is of high conductivity for EMI (Electromagnetic Interference) shielding, high transparency four touch sensing, low reflection for optical viewing, high scratch resistance for surface hardness, and low cost for manufacturing. For instance, the layer system has a surface resistance between $10^2 \Omega$/square to $10^3 \Omega$/square and is hard enough to pass the scratch test of military standard MIL-C-48497.

Thereby, a DC or AC magnetron sputtering can be used to deposit the first layer from an ITO target in the presence of a sputter gas of Ar and a very small partial pressure of $O_2$, under a given total pressure of approximately 3 m Torr (m=mili=0.001). For the second layer, it is proposed that by using AC magnetron sputtering from a silicon target, a layer of $SiO_2$ is generated in the presence of a sputter gas mixture comprising Ar and $O_2$, under a given pressure of 2 m Torr. For the third layer, it is proposed that via AC or pulse DC reactive sputtering from an Nb target, a layer of $Nb_2O_5$ is generated in the presence of a sputter gas mixture comprising Ar and $O_2$, under a given pressure of approximately 2.5 m Torr. For the fourth layer, it is proposed that via AC reactive sputtering from an NbSi target, a layer of $NbSiO_{4.5}$ is generated in the presence of a sputter gas mixture comprising Ar and $O_2$, under a given pressure of approximately 2 m Torr.

The following advantages are achieved with the present invention. The problem associated with a transparent conductive ITO layer, which is isolated by an insulating $SiO_2$ film in a conventional anti-reflection layer system, is solved. The present invention provides a four-layer system in which the surface material is ITO and has a refractive index between 1.9 and 2.1.

Because the surface layer of the anti-reflection coating is electrically conductive, several simple processes can be applied to make a good electrical contact with the anti-reflection coating. An example is to use this layer system in a touch sensor.

In the application of a screen filter or flat-CRT, the conventional grounding method using an ultra-sonic welding process that produces small and bright contamination of tin spots will be replaced. The process of final assembly of an anti-reflection coating on a screen filter or flat CRT will be simplified. The problem of formation of a non-uniform electric contact between the isolated conducive ITO layer and tin solder will be solved. The yield of the grounding process will increase. On the other hand, the layer structure also can be used as a basic coating of a touch sensor.

Accordingly, the present invention has a 4 layer system composed of an electrical conductive material as a surface layer which is a simple, and easy economic process for an anti-reflection coating on glass and plastic substrates.

DESCRIPTION OF THE PREFERRED EMBODIMENTS

The present invention relates to an oxide based anti-reflection coating with 4 layers. The multilayer structure is numbered in sequence beginning from the outermost layer i.e. the layer furthest form a substrate surface on which the thin films are deposited. Layer thickness values are specified as either a physical thickness in nm or as an optical thickness as some fraction or multiple of a wavelength of visible light. The typical wavelength value is 520 nm.

Figure 1:
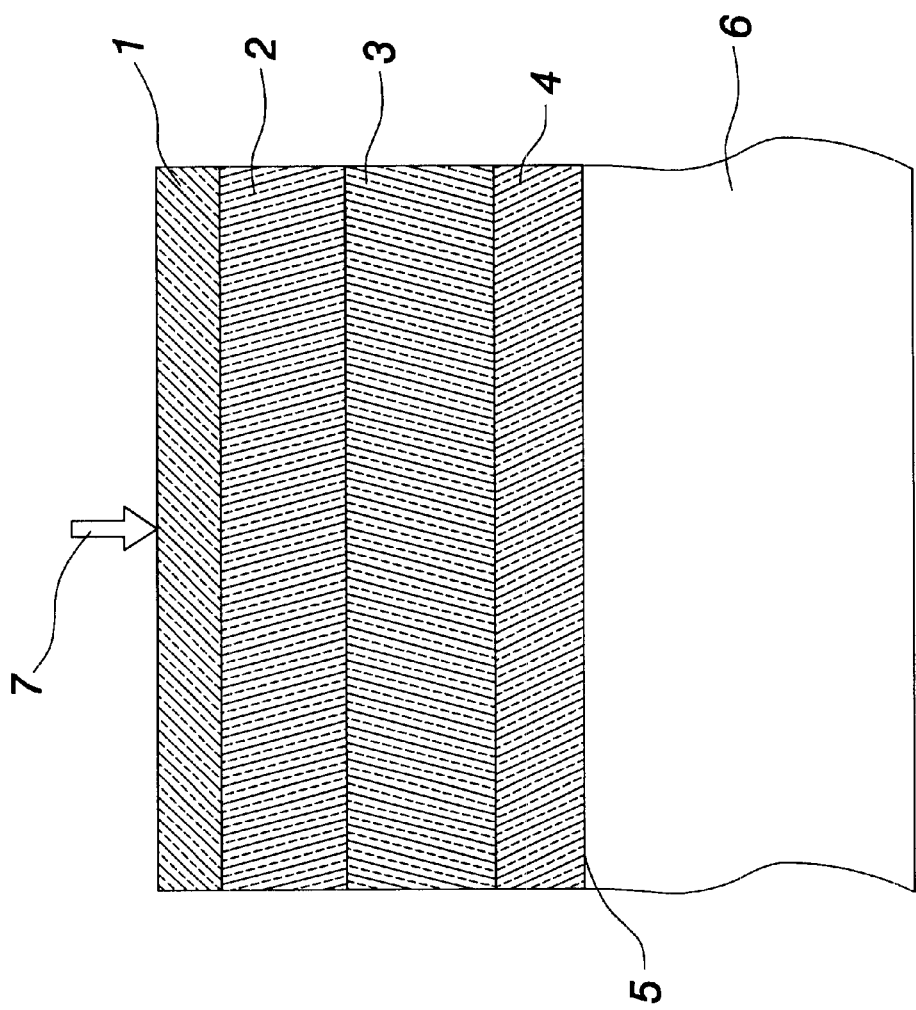
FIG. 1 schematically shows a cross-sectional view of a layer system according to the present invention.

The layer structure of a preferred embodiment of the present invention is shown in FIG. 1. A substrate 6 can be composed of glass, a plastic foil or other see-through materials. A front surface of the substrate, namely side 5, is that side of substrate facing the observer. The direction of viewing is indicated by arrow 7. A layer 4, which is contacting the front side 5 of the substrate 6, is called a fourth layer 4. In the direction toward the observer follows the third layer 3 arranged on the fourth layer 4, which is next to the front surface of the substrate. The second layer 2 is arranged on the third layer 3. The first layer or the outermost layer 1 is arranged on the second layer 2. The layers 1, 2, 3 and 4 form a layer system of the present invention.

The first layer, or the outermost layer 1 is an ITO layer with a thickness of 15 nm. The ITO layer has a refraction index of about 1.9~2.1 at a wavelength of about 520 nm. The second layer 2 of the layer system is a $SiO_2$ layer of a thickness of about 58 nm. The second layer has a refractive index of about 1.46 at a wavelength of about 520 nm. The third layer is an NbO layer of a thickness of 45 nm. The NbO layer has a refractive index of about 2.2 at a wavelength of about 520 nm. The fourth layer, or innermost layer 4 of the layer system is a NbSiO layer of a thickness of about 67 nm. The fourth layer has a refractive index of about 1.8 at a wavelength of about 520 nm.

Figure 2:
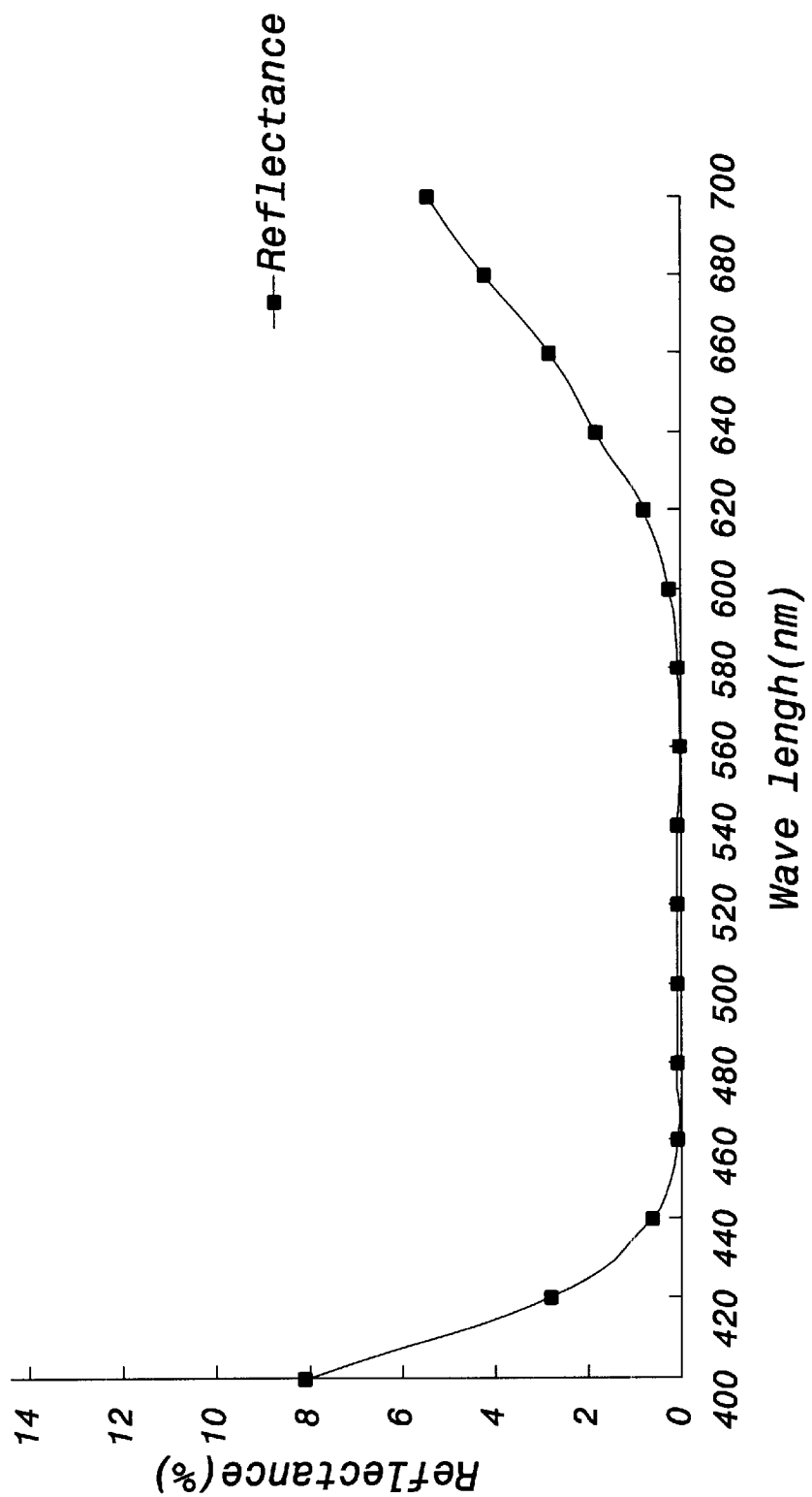
FIG. 2 shows the measured reflection curve in percent versus wavelength in nm of a layer system according to the present invention.

FIG. 2 shows the real reflection spectrum for the layer system. The reflection was measured in percent at the front surface of the glass. The visible spectrum extends from a wavelength of 400 nm to a wavelength of 700 nm. The curve reveals clearly that the reflection in the core wavelength region of the visible light particularly between 460 and 600 nm is extraordinarily low. It lies below 0.3%. This result was as good as the reflection spectrum measured from the layer system composed of the basic design of HLHL oxide materials.

Table 1 shows the detail data of reflection spectrum ranging from 400 nm to 700 nm. The sputtering of oxide layers 2,3 and 4 were performed with a magnetron cathode by using an AC sputter method in a reactive gas atmosphere composed of a gas mixture of Ar and $O_2$. On the other hand, for the first layer, namely ITO, the sputtering was performed with a magnetron cathode by using a DC or pulse DC sputter method in a reactive gas atmosphere composed of a gas mixture of Ar and a very slight amount of $O_2$. The target materials for layer 4, 3, 2 and 1 were NbSi, Nb, Si and ITO, respectively. The target to substrate distanced was about 15 cm. A heating device was applied in the sputtering system. The substrate temperature was kept at 100° to 300° C. during sputtering process.

TABLE 1

| Wavelength (nm) | Reflection (percent) |
| --- | --- |
| 400 | 8.10 |
| 420 | 2.80 |
| 440 | 0.63 |
| 460 | 0.10 |
| 480 | 0.08 |
| 500 | 0.10 |
| 520 | 0.10 |

TABLE 1-continued

| Wavelength (nm) | Reflection (percent) |
|---|---|
| 540 | 0.08 |
| 560 | 0.06 |
| 580 | 0.10 |
| 600 | 0.26 |
| 620 | 0.80 |
| 640 | 1.80 |
| 660 | 2.80 |
| 680 | 4.20 |
| 700 | 5.40 |

The working pressure during sputtering was described as follows:

Sputtering for the layer 4:2 m Torr sputtering for the layer 3:2.5 m Torr sputtering for the layer 2:2 m Torr sputtering for the layer 1:3 m Torr although various minor modifications may be suggested by those versed in the art, it should be understood that we wish to embody within the scope of the patent granted hereon all such modifications as reasonably and properly come within the scope of our contribution to the art.

I claim:

1. An anti-reflection conductive coating applied to a substrate comprising four layers designated as first, second, third, and fourth layers in consecutive numerical order beginning with the layer farthest from the substrate;

said first layer overlaying the second layer to form a surface layer and comprising a transparent conductive oxide material having a high refraction index substantially greater than 1.50, the first layer having a physical thickness of 10–40 nm;

said second layer overlaying the third layer and comprising an oxide material having a low refraction index substantially less than said high refraction index of said first layer, the second layer having a physical thickness of 30–60 nm;

said third layer overlaying the fourth layer and comprising an oxide material having a high refraction index substantially greater than 1.50, the third layer having a physical thickness of 30–80 nm;

said fourth layer overlaying a front surface of the substrate and comprising oxide material having high refraction index substantially greater than 1.50, the fourth layer having a physical thickness of 40–80 nm.

2. The anti-reflection conductive coating of claim 1, where said substrate is plastic.

3. The anti-reflection conductive coating of claim 1, where said substrate is glass.

4. An anti-reflection conductive coating applied to a substrate comprising four layers designated as first, second, third, and fourth layers in consecutive numerical order beginning with the layer farthest from the substrate;

said first layer overlaying the second layer to form a surface layer and comprising a transparent conductive oxide material having a high refraction index substantially greater than 1.50, the first layer having a physical thickness of 10–40 nm;

said second layer overlaying the third layer and comprising an oxide material having a low refraction index substantially less than said high refraction index of said first layer, the second layer having a physical thickness of 30–60 nm;

said third layer overlaying the fourth layer and comprising an oxide material having a high refraction index substantially greater than 1.50, the third layer having a physical thickness of 30–80 nm;

said fourth layer overlaying a front surface of the substrate and comprising oxide material having high refraction index substantially greater than 1.50, the fourth layer having a physical thickness of 40–80 nm.

wherein said first layer is ITO, said second layer is $SiO_2$, said third layer is a Niobium oxide and said fourth layer is a Silicon-Oxygen compound of Niobium.

5. An anti-reflection conductive coating of claim 1, wherein the first layer comprises an oxide material selected from the group consisting of: ITO, $SnO_2$, ZnO, $In_2O_3$, a combination of $SnO_2$ and F, a combination of $SnO_2$ and Sb, a combination of ZnO, and Al, a combination of $In_2O_3$ and ZnO, a combination of $SnO_2$ and ZnO, and a combination of $In_2O_3$ and MgO.

6. An anti-reflection conductive coating applied to a substrate comprising four layers designated as first, second, third, and fourth layers in consecutive numerical order beginning with the layer farthest from the substrate;

said first layer overlaying the second layer to form a surface layer and comprising a transparent conductive oxide material having a high refraction index substantially greater than 1.50, the first layer having a physical thickness of 10–40 nm;

said second layer overlaying the third layer and comprising an oxide material having a low refraction index substantially less than said high refraction index of said first layer, the second layer having a physical thickness of 30–60 nm;

said third layer overlaying the fourth layer and comprising an oxide material having a high refraction index substantially greater than 1.50, the third layer having a physical thickness of 30–80 nm;

said fourth layer overlaying a front surface of the substrate and comprising oxide material having high refraction index substantially greater than 1.50, the fourth layer having a physical thickness of 40–80 nm.

wherein said second layer comprises a material selected from the group consisting of: $SiO_2$ and $SiAlO_2$.

7. An anti-reflection conductive coating of claim 1, wherein said third layer comprises a material selected from the group consisting of: ITO, $Ta_2O_5$, a Niobium oxide, a Titanium Oxide, and mixtures of these oxides.

8. An anti-reflection conductive coating applied to a substrate comprising four layers designated as first, second, third, and fourth layers in consecutive numerical order beginning with the layer farthest from the substrate;

said first layer overlaying the second layer to form a surface layer and comprising a transparent conductive oxide material having a high refraction index substantially greater than 1.50, the first layer having a physical thickness of 10–40 nm;

said second layer overlaying the third layer and comprising an oxide material having a low refraction index substantially less than said high refraction index of said first layer, the second layer having a physical thickness of 30–60 nm;

said third layer overlaying the fourth layer and comprising an oxide material having a high refraction index substantially greater than 1.50, the third layer having a physical thickness of 30–80 nm;

said fourth layer overlaying a front surface of the substrate and comprising oxide material having high refraction index substantially greater than 1.50, the fourth layer having a physical thickness of 40–80 nm.

wherein said fourth layer comprises a material selected from the group consisting of: a Tantalum-Silicon oxide, a Niobium oxide, a Titanium-Silicon oxide, and Indium-Silicon oxide, a Tin-Silicon oxide, and mixtures of these oxides.

9. The anti-reflection conductive coating of claim 1, wherein said first layer is composed of an oxide material with a refractive index between 1.9 and 2.1; said second layer is composed of an oxide material with a refractive index between 1.46 and 1.5; said third layer is composed of an oxide material with a refractive index between 2.1 and 2.3; said fourth layer is composed of an oxide material with a refractive index between 1.90 and 2.1.

10. The anti-reflection conductive coating of claim 1, wherein said four layers are formed by an evaporation or sputtering process in a batch or in-line vacuum system.

11. A touch sensor comprising the anti-reflection conducting coating of claim 1.

* * * * *